US012677255B2

(12) United States Patent
Wu et al.

(10) Patent No.: US 12,677,255 B2
(45) Date of Patent: Jul. 7, 2026

(54) ASSISTANCE INFORMATION FOR PAGING SUBGROUPING

(71) Applicant: Nokia Technologies Oy, Espoo (FI)

(72) Inventors: Chunli Wu, Beijing (CN); Jussi-Pekka Koskinen, Oulu (FI); Mads Lauridsen, Aalborg (DK); Daniela Laselva, Aalborg (DK); Laura Luque Sanchez, Aalborg (DK); Jorma Johannes Kaikkonen, Oulu (FI); Faranaz Sabouri-Sichani, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 359 days.

(21) Appl. No.: 18/551,161

(22) PCT Filed: Mar. 31, 2021

(86) PCT No.: PCT/CN2021/084695
§ 371 (c)(1),
(2) Date: Sep. 18, 2023

(87) PCT Pub. No.: WO2022/205187
PCT Pub. Date: Oct. 6, 2022

(65) Prior Publication Data
US 2024/0188040 A1 Jun. 6, 2024

(51) Int. Cl.
H04W 68/02 (2009.01)
H04W 76/28 (2018.01)

(52) U.S. Cl.
CPC ........... H04W 68/02 (2013.01); H04W 76/28 (2018.02)

(58) Field of Classification Search
CPC . H04W 68/02; H04W 68/025; H04W 68/005; H04W 68/10; H04W 76/28
See application file for complete search history.

(56) References Cited

U.S. PATENT DOCUMENTS

| | | | | |
|---|---|---|---|---|
| 12,356,370 | B2 * | 7/2025 | Sha | ................... H04W 36/0016 |
| 2013/0344903 | A1 * | 12/2013 | Li | ........................... H04W 4/70 |
| | | | | 455/458 |

(Continued)

FOREIGN PATENT DOCUMENTS

| | | |
|---|---|---|
| CN | 101815250 A | 8/2010 |
| CN | 111466142 A | 7/2020 |
| WO | 2020/247043 A1 | 12/2020 |

OTHER PUBLICATIONS

"Revised WID UE Power Saving Enhancements for NR", 3GPP TSG RAN meeting #88e, RP-200938, Agenda Item: 9.10.7, MediaTek Inc., Jun. 29-Jul. 3, 2020, 5 pages.

(Continued)

*Primary Examiner* — Dung Hong
(74) *Attorney, Agent, or Firm* — McCarter & English, LLP

(57) ABSTRACT

This disclosure presents apparatuses and methods to determine, assign, and communicate paging subgroups using assistance information. In some aspects, assistance information can include user equipment (UE) parameters, for example, UE capability parameters, UE type parameters, ID preference parameters, location parameters, or mobility parameters. In some aspects, assistance information can include network parameters, cell parameters, or information about a subset or all UEs registered on the network. The radio access network (RAN) or core network (CN) can utilize the assistance information to determine the number of paging subgroups and to assign one or more subsets of UEs to each paging subgroup. The RAN or CN can communicate the paging subgroups to one or more of the UEs within the network. In some aspects, the paging subgroup can be directly indicated to the UE. In some aspects, the paging (Continued)

subgroup can be derived by the UE using the received paging subgroup information.

20 Claims, 6 Drawing Sheets

(56)                    References Cited

U.S. PATENT DOCUMENTS

| | | | | |
|---|---|---|---|---|
| 2020/0053645 | A1* | 2/2020 | Charbit | H04W 68/005 |
| 2020/0053695 | A1* | 2/2020 | Charbit | H04W 84/022 |
| 2020/0107267 | A1* | 4/2020 | Wu | H04W 76/28 |
| 2020/0245246 | A1 | 7/2020 | Dhanda et al. | |
| 2021/0014825 | A1 | 1/2021 | Shi et al. | |
| 2022/0264617 | A1* | 8/2022 | Sha | H04W 72/20 |
| 2022/0312371 | A1* | 9/2022 | Niu | H04W 52/0229 |
| 2023/0085723 | A1* | 3/2023 | Flordelis | H04W 68/02 |
| 2023/0119167 | A1* | 4/2023 | Niu | H04W 76/28 |
| | | | | 455/458 |
| 2023/0144750 | A1* | 5/2023 | Agiwal | H04W 48/12 |
| | | | | 455/422.1 |
| 2023/0247656 | A1* | 8/2023 | Sha | H04W 68/02 |
| 2023/0254814 | A1* | 8/2023 | Sha | H04W 52/028 |
| | | | | 455/458 |
| 2023/0379823 | A1* | 11/2023 | Berggren | H04W 52/0235 |
| 2024/0244582 | A1* | 7/2024 | Li | H04W 52/02 |

OTHER PUBLICATIONS

"[POST112-e][064][Pow17] Group Determination", 3GPP TSG-RAN WG2 #113 electronic, R2-2100389, Agenda Item: 8.9.2, Intel Corporation, Jan. 25-Feb. 5, 2021, 43 pages.
"Network assigned subgrouping", 3GPP TSG RAN WG2 Meeting #113e, R2-2101301, Agenda Item: 8.9.2, Intel Corporation, Jan. 25-Feb. 5, 2021, 3 pages.

"New WID on support of reduced capability NR devices", 3GPP TSG RAN Meeting #90e, RP-202933, Agenda Item: 9.1.1, Ericsson, Dec. 7-11, 2020, 5 pages.
"3rd Generation Partnership Project; Technical Specification Group Services and System Aspects; Study on system enablers for devices having multiple Universal Subscriber Identity Modules (USIM) (Release 17)", 3GPP TR 23.761, V1.2.0, Nov. 2020, pp. 1-108.
New WID: Support for Multi-SIM devices in Rel-17, 3GPP TSG RAN Meeting #86, RP-193263, Agenda Item: 9.1.2, vivo, Dec. 9-12, 2019, 5 pages.
"3rd Generation Partnership Project; Technical Specification Group Radio Access Network; NR; User Equipment (UE) procedures in Idle mode and RRC Inactive state (Release 16)", 3GPP TS 38.304, V16.3.0, Dec. 2020, pp. 1-39.
"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.3.0, Dec. 2020, pp. 1-64.
3rd Generation Partnership Project; Technical Specification Group Services and System Aspects; General Packet Radio Service (GPRS) enhancements for Evolved Universal Terrestrial Radio Access Network (E-UTRAN) access (Release 16), 3GPP TS 23.401, V16.9.0, Dec. 2020, pp. 1-440.
"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
International Search Report and Written Opinion received for corresponding Patent Cooperation Treaty Application No. PCT/CN2021/084695, dated Dec. 30, 2021, 9 pages.
"UE-Group Paging Early Indication", 3GPP TSG-RAN WG2 Meeting #113 electronic, R2-2101539, Agenda Item: 8.9.2, MediaTek Inc., Jan. 25-Feb. 5, 2021, pp. 1-4.
"Report of email discussion [Post111-e][907][ePowSav] UE grouping (Mediatek)", 3GPP TSG-RAN WG2 Meeting #112-e, R2-2009784, Agenda Item: 8.9.2, MediaTek Inc., Nov. 2-13, 2020, pp. 1-23.
"General requirements for potential paging enhancements", 3GPP TSG-RAN WG2 Meeting #112 Electronic, R2-2009351, Agenda item: 8.9.1, Nokia, Nov. 2-13, 2020, 2 pages.

* cited by examiner

100

120

110c

130c

140c

140b

130b

110b

130a

140a

110a

ASSISTANCE INFORMATION FOR PAGING SUBGROUPING

RELATED APPLICATION

This application was originally filed as PCT Application No. PCT/CN2021/084695 on Mar. 31, 2021, which is incorporated herein by reference in its entirety.

TECHNICAL FIELD

This application is directed, in general, to user equipment power savings for NR and, more specifically, to paging subgrouping.

BACKGROUND

In a communication system with user equipment (UE) and base stations, a communication link is established between the UE and one or more base stations. In Rel 17 of the 3GPP standard, there is a work item entitled, "UE Power Saving Enhancements for NR" [RP-200938] requesting suggestions for how to conserve UE power in consideration of system performance. User experience is key to 5G/NR success, not only in terms of experienced data rates and latency but also importantly UE power consumption. UE Power saving enhancements are therefore vital to the success of 5G/NR. In Rel-16, several useful power saving schemes were specified, including power saving signal/DCI as enhancement to connected-mode DRX (cDRX), additional adaptations to maximum MIMO layer number, SCell dormancy behaviour and cross-slot scheduling as enhancements to BWP framework, RRM relaxation as enhancements for idle/inactive-mode power consumption, and UE assistance information. In Rel-17, additional enhancements are required to address outstanding issues in Rel-16, namely idle/inactive-mode power consumption in NR SA deployments, considering both eMBB UEs and Reduced Capability NR Devices, connected-mode power consumption with FR2 deployments, and optimizing network utilization of Rel-16 UE assistance information.

SUMMARY

In one aspect, an apparatus is disclosed. In one embodiment, the apparatus includes (1) a transceiver, operable to receive and transmit communication signals, and (2) a processor, operable to communicate with the transceiver, and to determine one or more paging subgroups utilizing assistance information and a number of user equipment (UE) communicating with the transceiver, wherein the assistance information is utilized to determine an assignment of the UE to the one or more paging subgroups.

In a second aspect, a method is disclosed. In one embodiment, the method includes (1) receiving assistance information at a communication node regarding one or more UE, where the one or more UEs communicate with the communication node, (2) determining a number of paging subgroups in a set of paging subgroups, (3) assigning each of the one or more UEs to a respective paging subgroup in the set of paging subgroups, and (4) communicating to the one or more UE, the respective paging subgroup corresponding to the one or more UE.

In a third aspect, a system is disclosed. In one embodiment, the system includes (1) a UE, capable to transceive communications with a communication node, wherein the UE sends assistance information to the communication node, and (2) the communication node, capable to communicate one or more paging subgroups to the UE, receive one or more assistance information, determine a number of paging subgroups, and assign the UE to a paging subgroup, where the assistance information comprises one or more UE parameters or one or more network parameters and the one or more UE parameters is one or more of a UE capability parameter, one or more of a UE type parameter, one or more of an identification (ID) parameter, a location parameter, or a mobility parameter.

BRIEF DESCRIPTION

Reference is now made to the following descriptions taken in conjunction with the accompanying drawings, in which.

DETAILED DESCRIPTION

Figure 1:
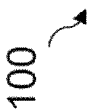
FIG. 1 is an illustration of a diagram of an example communication scenario with a radio access network (RAN) and multiple user equipment (UEs)

In the 5G 3GPP Release 17 proposed standard (3GPP), there is a work item (RP-200938) entitled "UE Power Saving Enhancements for NR" for implementing power saving techniques at the user equipment (UE). The UE is capable to transceive communications with one or more communication nodes. The UE can be in a radio resource control (RRC) IDLE state or an RRC_INACTIVE state in respect to the communication node. In some aspects, the power savings can be realized through the utilization of paging subgroups to reduce unnecessary UE paging receptions.

For the paging enhancement, RAN2 agreed to consider subgrouping as a candidate, and RAN1 agreed to consider paging early indication (PEI) as a potential candidate with which the UE can be informed before the paging occasion (PO) whether the UE needs to monitor the coming PO. RAN2 has agreed that the REL 17 3GPP power saving features will be applicable to new radio (NR) and reduced capability (RedCap) devices, and are being standardized per RP-202933. The solutions proposed for this work item should provide support for multiple subscriber identity module (SIM) (MUSIM) which have at least two concurrent states, one for each SIM of the UE, and is specified in RP-193263.

UEs, such as mobile phones, tablets, laptops, and other 5G devices whether movable, mobile, or stationary, can establish a communication link with one or more network devices, i.e., communication nodes. For example, various communication nodes can be a radio access network (RAN) such as a 5G base station (gNB), an evolved universal mobile telecommunications system (UMTS), terrestrial radio access (E-UTRA), an enhanced 4G eNodeB E-UTRA base station (eNB), e.g., an enhanced Node B, an enhanced gNB (en-gNB), or a next generation eNB (ng-eNB). Once a UE is registered with a communication node, the communication node can periodically send paging information to the UE. The types of pages and the frequency of pages sent to a UE can be controlled by the communication node. By reducing the number of unnecessary pages to a UE, the UE can thereby save power or improve performance.

For paging enhancements, the network assignment approach of paging subgroups is one of the directions that is being considered by 3GPP on top of UE-identification (ID) based subgrouping approach. Open questions from the standards body include which node will make the assignment, what information is needed for the network (NW) to be able to make the assignment, as well as how it works on top of UE-ID based approach.

The assignment may be based on paging probability of the UEs, type of the UEs (e.g. Redcap, enhanced mobile broadband (eMBB), or eMBB with MUSIM capability), and other parameters. This information may be known to the core network (CN). The number of subgroups in total that can be supported for a communication node should be configurable by the RAN utilizing the paging configuration, for example, a number of POs per paging frame (PF), extended discontinuous reception (eDRX) cycles, and other paging configurations, and system load.

For MUSIM devices, a single receiver/single transmitter MUSIM device that is in an RRC connected state, an RRC_idle, or an RRC_inactive state with a first SIM and in an RRC_connected state with a second SIM would need to interrupt its RRC connection with gaps in order to review paging messages. An interruption on PO's which may not have a paging for the UE is inefficient and can introduce unnecessary interruptions resulting in performance degradation in the SIM in the RRC_connected state, in addition to the increased power consumption this situation causes.

In the conventional paging mechanism, the UE will utilize its UE_ID to determine the system frame number (SFN) of the PF and the index of the PO within the PF where to monitor for paging messages, see TS 38.304.

Paging probability based subgrouping was supported for the group wake-up signal (WUS) (GWUS) in NB-IoT/eMTC where the CN and UE communicate the paging probability and the RAN/UE derives the UE's subgrouping based on the paging probability, the paging probability thresholds set by RAN and the UE ID, see TS 36.304. As per TS 23.401, the mobile management entity (MME) determines the WUS assistance information for the UE and provides it to the UE, and to the communication node when paging a UE. WUS assistance information is used by the communication node to help determine the WUS group used when paging the UE.

The number of UEs in each subgroup is not considered as part of such assistance information. Therefore, when applying conventional algorithms, even if a subgroup includes UEs that have similar paging probabilities, the resulting subgroup paging probability can be much higher if the subgroup size is large, given that the paging timing of different UEs in the subgroup can be orthogonal. A MUSIM device can inform about its MUSIM capability during initial registration and, optionally, share the UE-IDs corresponding to the UE's of other USIMs.

In this disclosure a coordination between the communication node and the UE can be established to determine a number of paging subgroups and to determine which UEs are assigned to each of the paging subgroups. In some aspects, the number of UEs in each paging subgroup can be utilized to limit the number of UEs assigned to one or more of the paging subgroups. In some aspects, the coordination can include a CN. The determination to which paging subgroup a UE is assigned can utilize a UE parameter, such as sent as part of an assistance information message. In some aspects, the determination can utilize assistance information received from a RAN or a CN, such as network parameters.

Each UE communicating with the communication node, such as during a registration period, can provide the assistance information, e.g., UE parameters, to the communication node. The registration period can be a non-access stratum (NAS) message, such as to a CN, an RRC message to a RAN, or other message types.

The UE parameter can be one or more parameters and can be a UE capability parameter, a UE type parameter, an identification (ID) preference parameter, a location parameter, or a mobility parameter. The UE capability parameter can be one or more parameters, such as indicating a UE with a MUSIM and whether it has a single receiver/single transmitter, or multiple of each. A UE type parameter can indicate a RedCap parameter, an eMBB parameter, a MUSIM parameter, a paging probability parameter, a power consumption profile parameter, an eDRX parameter, or a reduction of false alarm parameter.

The ID preference parameter can be provided by a UE with MUSIM capability and can indicate whether the UE requests that two or more of its SIMs be grouped in the same paging subgroup. When the ID preference parameter is not provided, the communication node can determine whether the SIMS of the same UE are in the same paging subgroup or assigned to different paging subgroups. The location parameter can indicate where the UE is located, such as fixed on a factory floor. The mobility parameter can indicate whether the UE is a mobile UE, a fixed location UE, a stationary UE, or a UE that may not have moved over a time interval.

The network parameters can include a number of UEs per subset parameter, a paging probability parameter, a UE type for each subset parameter, a number of stationary UEs, a number of UEs within the RA or RNA, and other network related parameters. The UE parameters and the network parameters can be collectively referred to as paging parameters.

There are various algorithms to determine the number of paging subgroups and the assignment of a UE to a paging subgroup. In some aspects, the UEs can be categorized into different paging subgroups utilizing the UE type parameter, for example, RedCap UEs can be assigned to a first paging subgroup and eMBB UEs can be assigned to a second paging subgroup. UEs with a similar type can have similar paging probabilities or similar power consumption profiles. A paging group that includes MUSIM UEs may not have similar paging probabilities while having similar desire to reduce false alarm paging. The reduction in false alarm paging can reduce the operational impact, such as degraded performance in the UEs RRC connection with another SIM, thereby having an impact on the power consumption.

In some aspects, the UE can receive the information on the paging subgroup it has been assigned, while how the UE parameters are utilized by the communication node can be kept at the communication node, such as using the UE paging frequency, MUSIM capability, or UE power consumption profile.

In some aspects, different number of paging subgroups can be assigned to different types of UEs. For example, RedCap UEs can be assigned to a first paging subgroup while the set of eMBB UEs can be split among a second and third paging subgroup. Another example is that the eMBB UEs that are MUSIM can be in a second paging subgroup and the non-MUSIM eMBB UEs can be in a third paging subgroup. In some aspects, the paging subgroups that include MUSIM UEs can be restricted as to the number of UEs included in the paging subgroup, for example, utilizing a maximum number of UE parameter for the paging subgroup. The restriction as to the number of the paging subgroup can further reduce the number of false alarm paging.

In some aspects, a paging subgroup can include UEs of different types, such as MUSIM and eMBB types. In this aspect, the paging subgroup can apply a weighting to one or more of the UE types, which, when combined with the maximum number of UE parameter, can reduce the number of UEs in the paging subgroup. For example, if the maximum number of UE parameter is 10 and MUSIM UEs are given a weight of 2, then the paging subgroup can include 4 eMBB UEs and 3 MUSIM UEs to reach the maximum number of UE parameter. A MUSIM UE can have two or more independent UE IDs corresponding to the UE's subscriptions and the NW can be aware of the two or more UE IDs which belong to the same UE. The UE's IDs do not need to be in the same paging subgroup. In some aspects, the UE can provide the ID preference parameter to have two or more of its UE IDs in the same paging subgroup, such as for paging coordination. In some aspects, the ID preference parameter can be passed as part of the assistance information.

In some aspects, a reduction of false alarm parameter can be utilized to determine to which paging subgroup a UE is assigned. Utilizing UE response information to paging events, the communication node can assign UEs with a low paging response rate to a first paging subgroup and the UEs with a high paging response rate to second paging response rate. For example, the reduction of false alarm parameter can be a value, such as 10, where UEs that exceed the value are assigned to a first paging subgroup, and the UEs that meet or are less than the value are assigned to a second paging subgroup. Other values and algorithms can be utilized as well. Another example, is that the reduction of false alarm parameter can be a percentage and a value such that the UEs with a false alarm rate that is within the percentage of the value are grouped together. In some aspects, there can be more than one reduction of false alarm parameters used by the communication node.

In some aspects, the determination algorithm can utilize a subtype of the UE. For example, a first paging subgroup can include RedCap or MUSIM UEs with a subtype 1 or a subtype of 2 and a second paging subgroup can include RedCap or MUSIM UEs with a subtype 3 or subtype 4. The subtypes can utilize UE category or subscription type.

In some aspects, different algorithms can be applied to different paging subgroups, such as using a paging subgroup parameter. For example, a first paging subgroup can utilize a UE ID preference parameter, a second paging subgroup can utilize a paging probability parameter, and a third paging subgroup can utilize a MUSIM type. In this aspect, the communication node can balance the UEs across the available paging subgroups. There can be more than one appropriate paging subgroup for a UE. The communication node can utilize an algorithm, default parameters, or other methods to determine which paging subgroup a UE can be assigned if there are more than one paging subgroup that is possible. In some aspects, different paging probabilities can be assigned for different RedCap UE types so that the RedCap UEs can be in different paging subgroups. In some aspects, the same algorithm can be utilized for the UEs of a specified type, such as UEs with the same capabilities or UEs with an ID preference parameter.

In some aspects, a CN, such as an access and mobility management function (AMF) can provide information to the communication node, such as a RAN or gNB, as to whether the UE supports PEI or paging subgrouping. For example, this assistance information can be provided along with or as part of the paging message.

In some aspects, the UE can receive an explicit indicator to which paging subgroup it has been assigned, such as a one or more bits of information. In some aspects, the UE can receive an implicit indicator to which paging subgroup it has been assigned, such as an indicator designating a first paging subgroup for RedCap UEs, a second paging subgroup for MUSIM UEs, and a third paging subgroup for eMBB UEs. The receiving UE can determine to which paging subgroup it has been assigned using the indicator information. In some aspects, the paging subgroup the UE is assigned to can be derived utilizing the UE subset it belongs to and the number of paging subgroups that are assigned to the UE subset.

In some aspects, the communication node can be a RAN and the RAN can perform the disclosed methods and algorithms while not using the CN, such as when the paging subgroups are for UEs in an RRC_INACTIVE state. In this aspect, the RAN can know how many UEs there are supporting paging subgrouping, and how many of each type of UE are on the RAN notification area (RNA) in an INACTIVE state. In some aspects, one or more portions of this information can be obtained by the RAN while the UE is in a connected state.

In some aspects, the communication node can indicate to the UE the paging subgrouping utilizing a system information message or an RRC_Release message.

An example, for demonstration purposes, of the messaging changes to the 3GPP standard are shown in Table 1. Other messaging changes and different messaging changes can be utilized to implement this disclosure; Table 1 is for example.

TABLE 1

| Example messaging to support paging subgroups | |
|---|---|
| Message | Change |
| Message: assistance information (for example, sent from UE to RAN or CN) | Add field for the UE capability parameter. Add a field for the UE type parameter. Add a field for the ID preference parameter. Add a field for the location parameter. Add a field for the mobility parameter. |
| Message: assistance information (for example, sent from CN to RAN) | Add a field to indicate the subgrouping split between one or more subsets of UEs. Add a field to indicate a UE and a corresponding paging subgroup. |

TABLE 1-continued

Example messaging to support paging subgroups

| Message | Change |
|---|---|
| | Add a field to indicate the number of paging subgroups. |
| | Add a field to indicate the number of paging subgroups assigned to each UE subset. |
| Message: subgroup assignment (for example, sent from CN to UE) | Add a field to indicate a UE and a corresponding paging subgroup. |
| Message: system information (for example, sent from RAN to UE) | Add a field to indicate a bit split for the paging subgroups within each subset of UE types. |
| | Add a field to indicate that the UE should select the paging subgroup that matches the UE's parameters. |

Some aspects can be summarized as UE-ID based subgrouping used as the baseline for subgroup determination. Paging probability-based approach can be supported for NB-IoT where paging probabilities are deterministic for certain types of NB-IoT devices and can vary largely for different types of devices. The CN and UE can communicate the paging probability, then the RAN and UE can derive the UE's paging subgrouping utilizing the paging probability with the paging probability thresholds set by the RAN and the UE ID. The Rel-17 power saving work item targets various types of UEs and deterministic paging probability as for NB-IoT devices can be difficult to ascertain.

NW assignment-based approach was discussed in a RAN2 meeting as an attempt to find a potential way forward if it can cover multiple aspects proposed, e.g., if the NW can take into account paging probability, power consumption profile, mobility states, and other factors into account when assigning the paging subgroup. It was not stated or determined in these meetings whether the CN or the RAN should assign the paging subgroup, utilizing what information, or if assistance information can be utilized by the communication node assigning the paging subgrouping for the paging subgroup determination and assignment of each UE.

When the NW assignment-based mechanism is utilized, the RAN can be able to determine the number of paging subgroups to be supported taking the RAN's paging configuration and load situation into account, where other cells within the same tracking area do not need to support the same number of paging subgroups.

Some aspects can be summarized as when the NW assignment-based subgrouping is supported, the same number of paging subgroups for various cells within the same tracking area do not need to be the same. The CN may not have information on the number of paging subgroups each cell supports in the RAN. The aspects can assign the UEs to different UE subsets rather than assigning each UE to a paging subgroup. The UEs within each subset can have the same paging probability or the same type, e.g., RedCap UEs or eMBB UEs. The UE subsets can be determined by the NW implementation with potential UE assistance information. Similar to the paging probability-based paging subgrouping for NB-IoT, the CN and UE interaction can be utilized to determine the UE subset the UE should be placed in. These aspects can operate with the UE_ID based approach with the UEs in same UE subset uniformly distributed into different paging subgroups utilizing the UE_ID if multiple paging subgroups for the UE subset are available.

Some aspects can be summarized as when the NW assignment-based subgrouping is supported, the CN can assign the UEs of the same characteristic to the same UE subset and the UEs within the subset can be uniformly distributed into multiple subgroups based on the UE_ID.

Some aspects can be summarized as CN and UE coordination can be utilized to determine the UE subset the UE is placed in and the CN can indicate the UE subset of the UE to the RAN at a time when the UE is paged. Regarding to the role of the RAN, the RAN can determine the total number of subgroups and the split of the subgroups for different UE subsets considering the RAN's paging configuration and load situation. In some aspects, the RAN can utilize coordination between the CN and the RAN on how many subgroups needs to be supported for each UE subset, e.g., depends on the number of different types of UEs in the tracking area, an estimated paging probability of the UEs in the different UE subsets, and other factors.

Some aspects can be summarized as when the RAN determines the total number of paging subgroups and the number of paging subgroups for each UE subset. In some aspects, the RAN can utilize assistance information from the CN.

Some aspects can be summarized as when the CN can assign the UEs into different UE subsets and the UEs within each UE subset are uniformly distributed into different subgroups based on their respective UE_ID. In some aspects, the RAN can determine the total number of subgroups and the number of subgroups for each UE subset. In some aspects, the coordination between the CN and the UE, and the coordination between the CN and the RAN, can be utilized to determine the UE subset of the UE and number of paging subgroups. In some aspects, the RAN and the UE can derive the paging subgrouping of the UE utilizing the UE subset of the UE, the number of paging subgroups within the UE subset, and the UE_ID of the UE. By default, if no subset is assigned, the UEs are put in the same set and the UE_ID is used to derive the paging subgroup the UE belongs to.

Turning now to the figures, FIG. 1 is an illustration of a diagram of an example communication scenario 100 with a RAN and multiple UEs. Communication scenario 100 is a demonstration of one type of environment for this disclosure. The environment for communication scenario 100 includes a UE 110a, a UE 110b, a UE 110c (collectively, UEs 110), and a RAN 120. UEs 110 are in an RRC connected state, an RRC_IDLE state, or RRC_INACTIVE state with RAN 120. There can be fewer or additional UEs in UEs 110. RAN 120 can be a gNB or other type of base station.

An example set of messages are shown in communication scenario 100. At a registration time of UE 110a, UE 110a sends a message 130a to RAN 120. Message 130a can include one or more UE parameters, such as a UE capability parameter, a UE type parameter, an ID parameter, a location parameter, or a mobility parameter. Likewise, UE 110b can send its UE parameters through message 130b and UE 110c can send its UE parameters through message 130c, (collectively, messages 130). Messages 130 can be RRC messages such as when communicating with RAN 120. In some aspects, messages 130 can be transmitted to a CN and use NAS messages. In some aspects, messages 130 are part of an assistance information message.

In some aspects, RAN 120 can determine a paging subgroup for each of the UEs in UEs 110 and the paging subgroup assignments can be transmitted to the UEs 110 using the message 140a for UE 110a, message 140b for 110b, and message 140c for 110c (collectively, messages 140), such as using a system information signal, an RRC Release signal, or an RRCReconfiguration signal. In some aspects, messages 140 can be targeted to each respective UE of UEs 110, where messages 140 specify the respective paging subgroup and an ID for the respective UEs 110. In some aspects, messages 140 can be broadcast to the UEs 110. In some aspects, messages 140 can include an assignment reference, for example, all RedCap or all MUSIM type UEs are assigned to a specific paging subgroup, and the respective UEs 110 determine which paging subgroup to respond.

Figure 2:
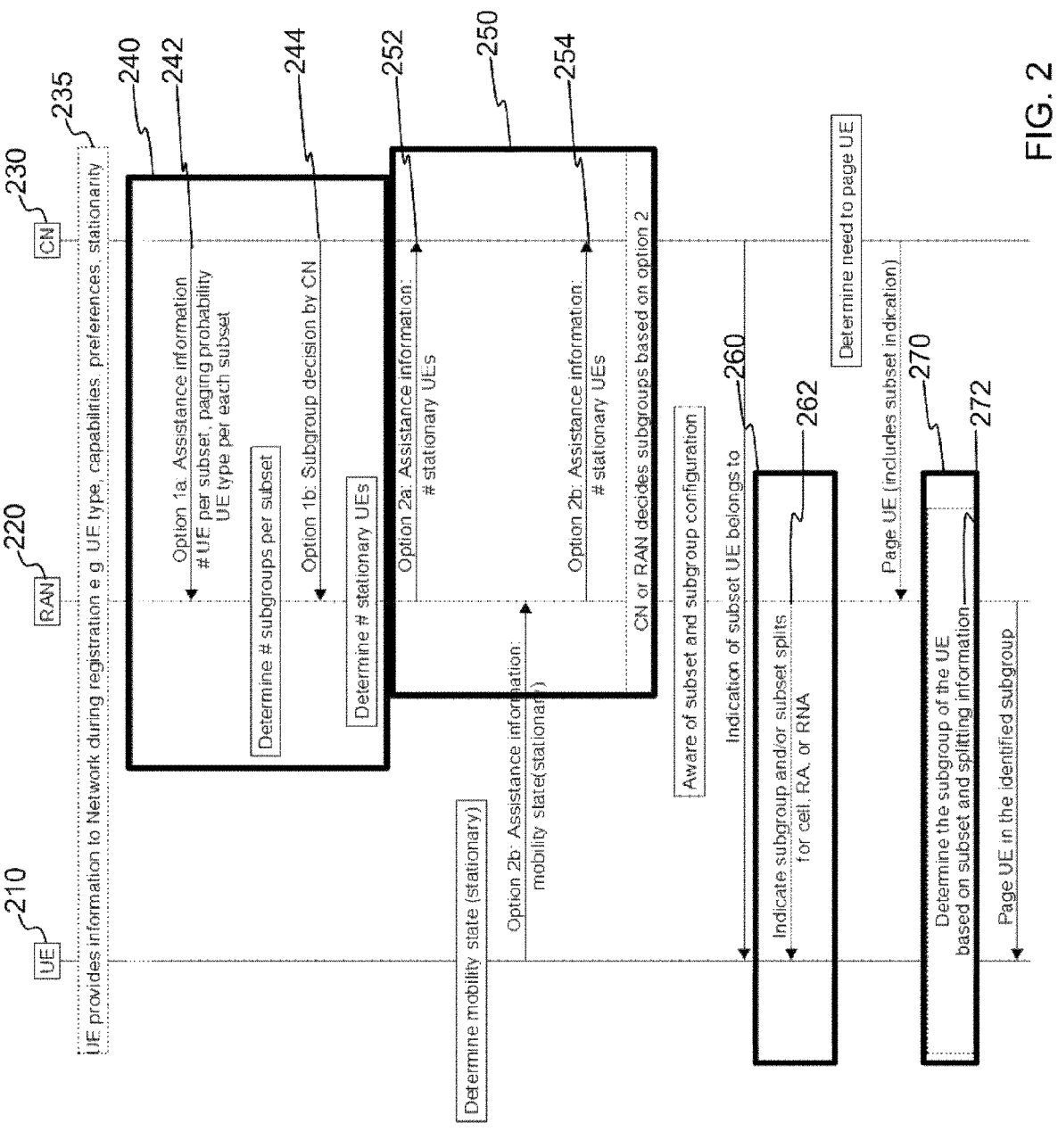
FIG. 2 is an illustration of a diagram of an example signal flow for the determination of paging subgroups.

FIG. 2 is an illustration of a diagram of an example signal flow 200 for the determination of paging subgroups. Signal flow 200 demonstrates several aspects of the disclosure to determine the paging subgroups. Signal flow 200 has an UE 210, RAN 220, and a CN 230. RAN 220 can be a gNB or other type of communication node. In signal flow 235, UE 210 provides registration information to the NW. With or in addition to the registration information, UE 210 can provide UE parameters and assistance information, such as UE capability parameters, UE type parameters, ID preference parameters, location parameters, and mobility parameters.

A box 240 highlights the algorithm options (shown as Option 1a and Option 1b) for aspects where CN 230 provides assistance information to RAN 220, where the assistance information can be utilized for splitting the UEs in a registration area among two or more paging subgroups. A signal flow 242, identified as Option 1a, describes the number of UEs in each UE subset. Signal flow 242 is communicated from CN 230 to RAN 220. RAN 220 can utilize this information to determine the number of paging subgroups mapped to each UE subset. In some aspects, paging probability information in each UE subset can be part of the assistance information. In some aspects, the UE types for each UE subset can be part of the assistance information.

A signal flow 244, identified as Option 1b, describes the number of subgroups mapped to each UE subset that has been determined by CN 230 and communicated to RAN 220. In some aspects, the determination by CN 230 can utilize paging probability parameters, UE type parameters, or other parameters. In some aspects, CN 230 can utilize a number of UEs in each UE subset. For example, a specified number of paging subgroups utilized for UE subset 1 and a different specified number of paging subgroups for UE subset 2. Another example can utilize a percentage for each UE subset, such as 25% of the paging subgroups utilized for a special group of UEs or UE subset 1. The balance of paging subgroups can be assigned for UE subset 2. In some aspects, the information can be common per registration area (RA) for UEs in an IDLE state. In some aspects, the information can be common per RNA for UEs in an INACTIVE state. In some aspects, the information can be gNB or cell specific. CN 230 can determine a time to update the assistance information, such as using a trigger event or a time interval, such as once every 24 hours.

A box 250 highlights the algorithm options (shown as Option 2a and Option 2b) for aspects where RAN 220 provides assistance information to CN 230, where the assistance information can be utilized for determining the assignment of UEs to the paging subgroups. A signal flow 252, identified as Option 2a, describes an algorithm where RAN 220 determines the split of paging subgroups utilizing local information, for example, whether some UEs are stationary UEs. In some aspects, RAN 220 can observe that certain UEs remain within a cell's coverage area for an extended period of time, such as RedCap sensors or video cameras that do not move. In some aspects, UE 210 is a stationary device, for example, a fixed mounted device in a factory or at roadside, and UE 210 can provide this information to CN 230 at the UEs initial registration.

A signal flow 254, shown as Option 2b, describes an algorithm where local information, such as stationarity or mobility information, can be communicated to CN 230. CN 230 can determine the UE subset to paging subgrouping assignments.

In some aspects, UE 210 can provide assistance information to RAN 220 or CN 230, where the assistance information can include, for example, UE type parameters or location parameters. In some aspects, where UE 210 is a MUSIM type, UE 210 can provide ID preference parameters requesting to have UE's 210 IDs, corresponding to two or more of its SIMs, in the same paging subgroup.

A box 260 indicates the signal flows that can be utilized by RAN 220 for indicating to UE 210, where UE 210 is associated to the UE subset, the splitting of the paging subgroups utilizing subgrouping bits. A signal flow 262 can be utilized to communicate the paging subgroups. In some aspects, the indication can be signaled using a system information block (SIB), in a PEI, or in paging DCI signal as part of the subgrouping information. In some aspects, the paging subgroups can be determined utilizing a per cell basis without a common setting for the RA or RNA. In some aspects, RAN 220 can determine a different number of total bits and the split utilizing its paging configurations, for example, a number of POs in each PF, a paging DRX cycle, a system load, or other paging configurations. In some aspects, RAN 220 can determine the paging subgroups utilizing assistance information received from CN 230 or information received locally, e.g., local information. For example, RAN 220 can assign M+N subgrouping bits and uses M bits for sub-groups in UE subset 1, such that UE subset 1 can be split in $2^M$ paging subgroups or M paging subgroups with a bitmap for each paging subgroup. N bits can be utilized for paging subgroups in UE subset 2, such that UE subset 2 can be split in $2^N$ paging subgroups or N paging subgroups with a bitmap for each paging subgroup.

A box 270 indicates the signal flows that can be utilized by RAN 220 or CN 230 for indicating to UE 210 which UE subset or paging subgroup UE 210 has been assigned, such as using a signal flow 272. In some aspects, signal flow 272 can include the paging message from CN 230 to RAN 220. In some aspects, when a different algorithm is applied to each UE subset, the paging subgroup algorithm utilized for UE 210 can be identified or pre-defined. In some aspects, signal flow 272 can provide the paging subgroups and UE 210 can determine the paging subgroup to respond to, for example, UE 210 is a RedCap type and UE 210 selects the RedCap paging subgroup.

In some aspects, RAN 220 can derive the paging subgroup to which UE 210 belongs and page UE 210 accordingly. The derivation can utilize the UE subset of UE 210, the number of bits available for the corresponding UE subset (such as M bits), or the UE-ID if with a uniformed distribution within each UE subset. For example, UE 210 can determine its paging subgroup out of the $2^M$ paging subgroups or M paging subgroups assigned to its UE subset utilizing UE's 210 UE ID, paging probability parameter, UE MUSIM capability, or other UE type parameters. A gNB of RAN 220 can proceed likewise. An advantage is that different UE types, e.g., different UE subsets, do not mix in the same paging subgroup.

Figure 3:
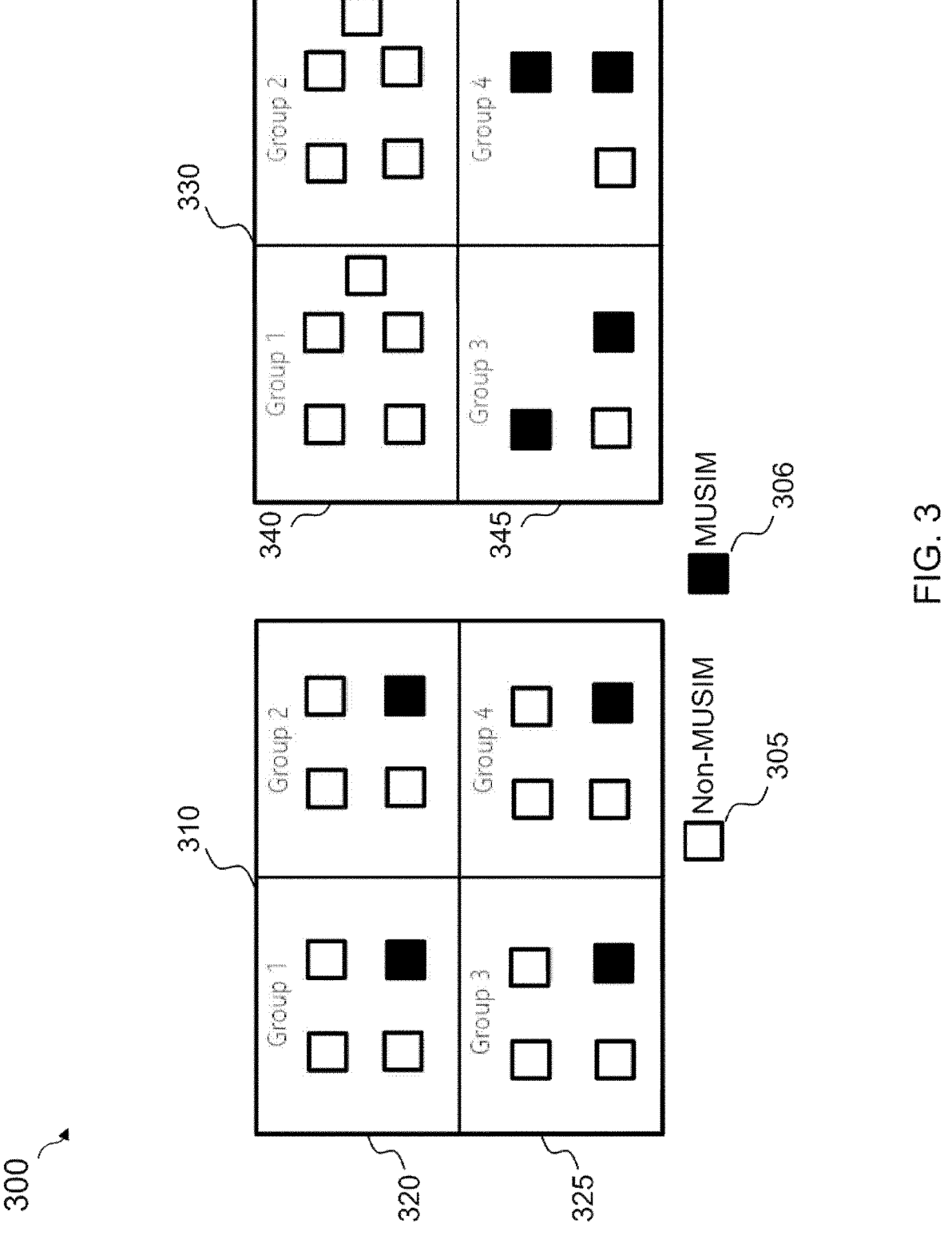
FIG. 3 is an illustration of a diagram of an example paging subgroup scenario.

For example, if the paging subgroups are assigned by CN 230 and signal flow 272 requires more than the available bits for the UE subset from RAN 220, then UE 210 can derive the mapped paging subgroup bit utilizing the assigned subgroup, assigned by CN 230, and the actual available bits from RAN 220. For example, utilizing the CN_assigned-_subgroup parameter mod by the number of bits from RAN 220 for the UE subset. A specific example can be that CN 230 can assign paging subgroups 1, 2, 3, and 4 for UE subset 1. RAN 220 can allocate two bits for paging subgrouping. The UEs assigned by CN 230 to paging subgroups 1 and 3 can be put together by RAN 220 in a first paging subgroup and UEs assigned by CN 230 to paging subgroups 2 and 4 can be put together by RAN 220 in the second paging subgroup. FIG. 3 is an illustration of a diagram of an example paging subgroup scenario 300.

Paging subgroup scenario 300 is one demonstration of how UEs can be assigned to one or more paging subgroups. In a scenario 310, the communication node has determined that there should be four paging subgroups. Using a random grouping algorithm, each paging subgroups includes four UEs. The outline boxes indicate non-MUSIM UEs 305 and the solid boxes indicate MUSIM UEs 306. Group-1 320 has three non-MUSIM UEs 305 and one MUSIM UE 306. Group-3 325 is likewise situated.

In a scenario 330, the communication node has determined a different grouping of UEs and uses one of the algorithms described herein to allocate the UEs to each respective paging subgroup. Group-1 340 includes five UEs where each of the UEs is a non-MUSIM UE 305. Group-1 340 is grouping UEs by the UE type parameter. Group-3 345 includes one non-MUSIM UE 305 and two MUSIM UEs 306. Non-MUSIM UE 305 and one MUSIM UE 306 of group 3 345 are grouped by a similar UE capability parameter. In addition, a second MUSIM UE 306 of group 3 345 is included in group 3 345 because, in this demonstration, the UE for the second MUSIM UE 306 requested that the UEs two MUSIM be grouped together using an ID preference parameter.

Figure 4:
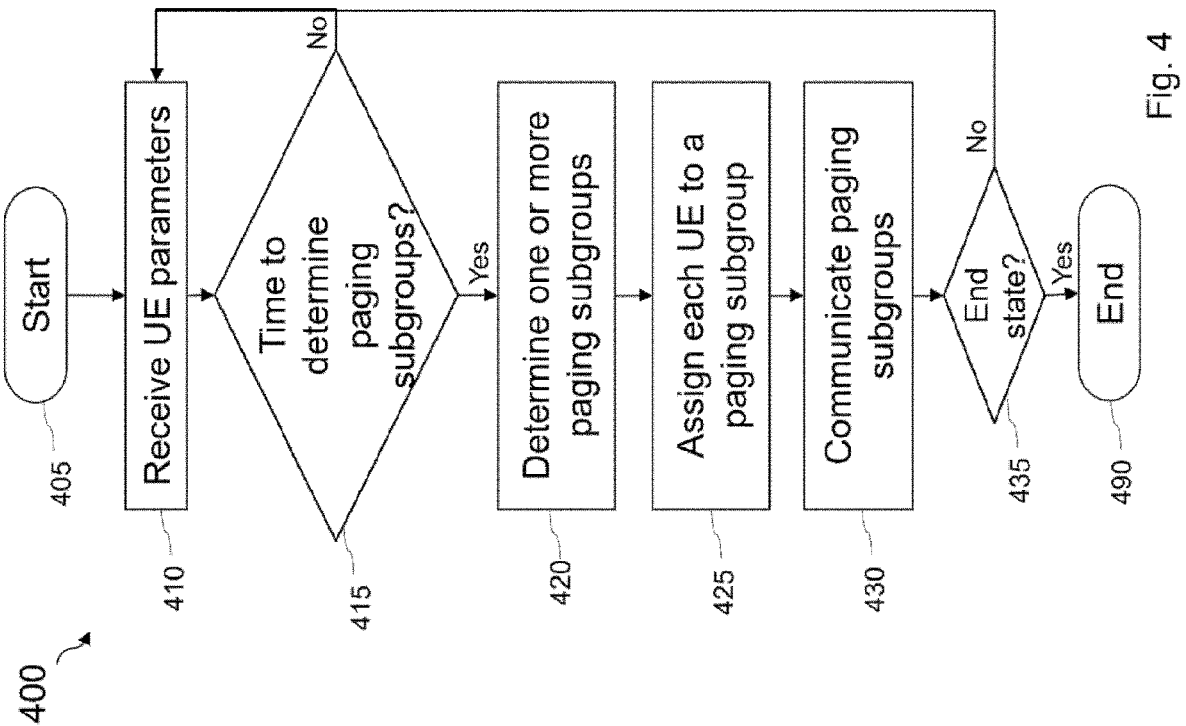
FIG. 4 is an illustration of a flow diagram of an example method to determine paging subgroups.

FIG. 4 is an illustration of a flow diagram of an example method 400 to determine paging subgroups. Method 400 can be implemented on a set of network devices and communication nodes, such as a RAN, gNB, an eNB, an en-gNB, an ng-eNB, and a CN. Method 400 can be encapsulated in software code or in hardware, for example, an application, a code library, a dynamic link library, a module, a function, a RAM, a ROM, and other software and hardware implementations. The software can be stored in a file, database, or other computing system storage mechanism. Method 400 can be partially implemented in software and partially in hardware. Method 400 can be implemented using communication system 500 of FIG. 5 or paging subgroup controller 600 of FIG. 6.

Method 400 starts at a step 405 and proceeds to a step 410. In step 410, the communication node receives one or more UE parameters from one or more UEs, such as through an assistance information message. The UE parameters can include one or more of each of UE capability parameters, UE type parameters, ID preference parameters, location parameters, or mobility parameters. The UE parameters provide a description of the UE to allow the communication node to determine into which paging subgroup each UE should be assigned. In some aspects, a CN can provide additional assistance information, e.g., network parameters, to the communication node, for example, subgrouping split information. In some aspects, the communication node can be a CN. In some aspects, the communication node can be a RAN.

Proceeding to a decision step 415, a determination is made on whether paging subgroups should be determined. The determination can be made using one or more trigger events. The trigger events can be a time interval, a time when a number of UEs drop from the communication node exceeds a UE drop count parameter, a time when a number of UEs join the communication node exceeds a UE join count parameter, a time when a number of UEs in a subgroup exceeds a UE maximum subgroup count parameter, a time when a paging activity for a paging subgroup changes by more than a paging activity parameter, or a time when a paging response to paging probability ratio for a UE does not satisfy a paging ratio parameter. For example, the UE drop count parameter can be set to 20 meaning that after 21 dropped UEs, the paging subgroup determination is performed, or a paging ratio parameter can be set to 50% meaning that if less than 50% of the pages sent are respond to by the UE, then the UE may be in an incorrect paging subgroup. If decision step 415 is 'Yes', method 400 proceeds to a step 420. If decision step 415 is 'No', method 400 proceeds to step 410.

Proceeding to step 420, a determination is made on the number of paging subgroups needed. In a step 425, a determination is made to which paging subgroup each UE is assigned. The determination utilizes the assistance information, e.g., the UE parameters and the network parameters received. For example, UEs of similar types can be grouped together, UEs of similar capabilities can be grouped together, and UEs with a similar expectation of responding to pages can be grouped together. In addition, the UE, when a MUSIM UE, can request that two or more of the SIMs of the UE be grouped together. Other factors to consider can be the number of UEs per paging subgroup, performance considerations, paging probabilities, rate of false alarms, the number of stationary, fixed, mobile, or unmoving UEs, or other factors.

Proceeding to step 430, the paging subgroups can be transmitted to the UEs. In some aspects, the paging subgroups can be sent to the UEs which have been assigned to that paging subgroup. In some aspects, the paging subgroups can be sent to all UEs. In some aspects, the paging subgroups can include a reference to a type of UE and each UE will respond only to the paging subgroup whose type matches the UE parameter for the UE. In some aspects, the RAN communicates the paging subgroups. In some aspects, the CN communicates the paging subgroups. Method 400 proceeds to a decision step 435.

In decision step 435, an end state can be checked for method 400. If the end state is 'Yes', then method 400 proceeds to step 490 and ends. If the end state is 'No', then method 400 proceeds to step 410 where any additional received assistance information can be processed and the assistance information corresponding to dropped UEs can be removed from the determination analysis. The end state can be one or more of various end states such as when all UEs drop from the communication node, the communication node is reset, or other end states.

Figure 5:
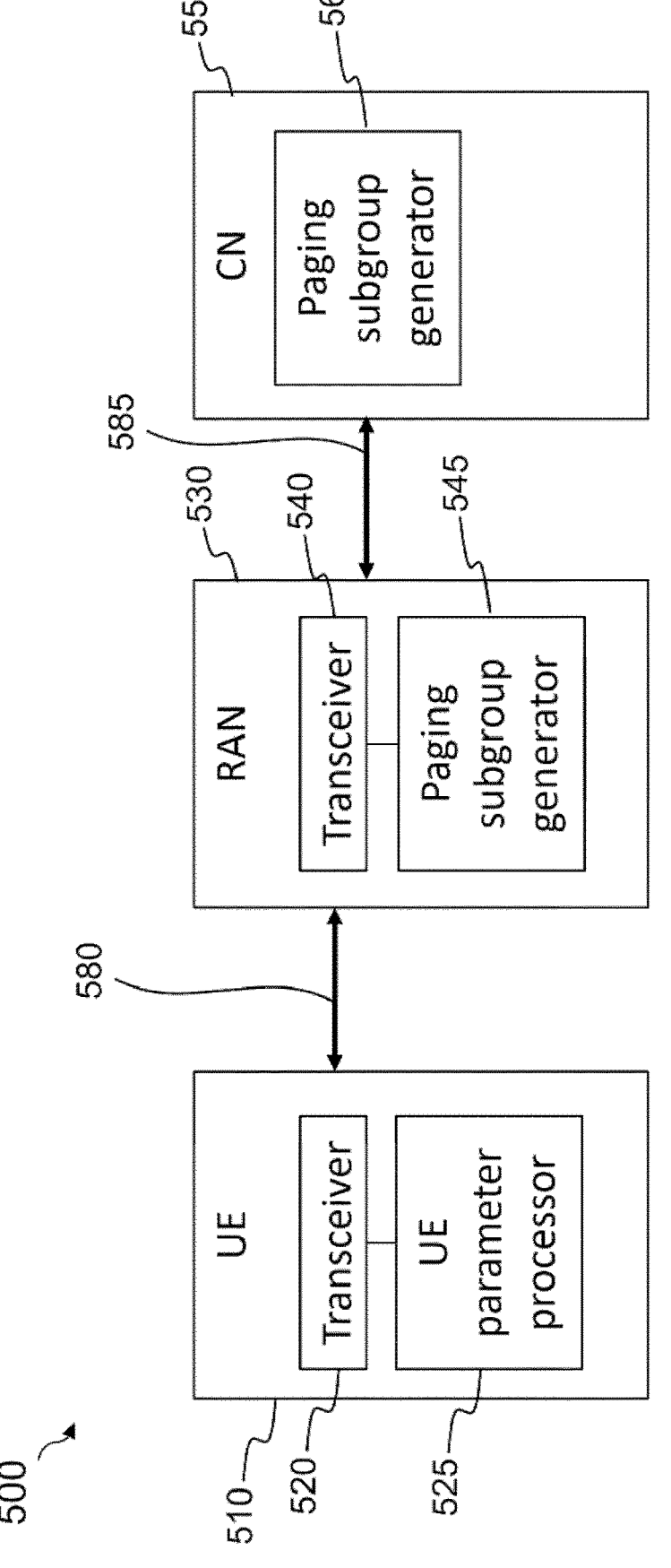
FIG. 5 is an illustration of a block diagram of a communication system using paging subgroups.

FIG. 5 is an illustration of a block diagram of a communication system 500 using paging subgroups. Communication system 500 is an example system and could have additional communication nodes and additional UEs. Communication system 500 has a UE 510 and a communication node 530, shown as a RAN in this example. Optionally, communication system 500 can include a CN 550.

UE 510 has a transceiver 520 capable of receiving communication signals and transmitting communication signals with communication node 530 using signal connection 580, for example, sending a UE assistance information message or receiving an indicator of the paging subgroup to which the UE has been assigned. UE 510 has a UE parameter processor 525, which can format the UE parameters for transmission to communication node 530.

Communication node 530 has a transceiver 540 capable of receiving communication signals and transmitting communication signals with UE 510 using signal connection 580. Communication node 530 has a paging subgroup generator 545 that is capable of analyzing the received assistance information, such as received from UE 510 or CN 550. Paging subgroup generator 545 is capable of determining a number of paging subgroups and determining an assignment of UEs to each of the paging subgroups utilizing the assistance information, for example, the algorithm described in method 400 of FIG. 4. Communication node 530 can communicate the determined and assigned paging subgroups to UE 510 using, for example, a system information signal, an RRC Release signal, or an RRCReconfiguration signal.

CN 550 can communicate with communication node 530 using communication signal 585, such as to send or receive assistance information, or to communicate the paging subgrouping. CN 550 includes a paging subgroup generator 565. Paging subgroup generator 565 is capable of communicating assistance information to communication node 530. In some aspects, paging subgroup generator 565 can perform the subgroup determinations as disclosed herein, such as described in method 400 of FIG. 4, and communicate the one or more paging subgroups to communication node 530. In some aspects, paging subgroup generator 565 has the same capabilities as paging subgroup generator 545.

The elements of UE 510, communication node 530, and CN 550 are shown as a functional view, where the implementation can be by software, hardware, or a combination thereof. In some aspects, the functions shown can be combined with other functions of the respective UE 510, communication node 530, or CN 550.

Figure 6:
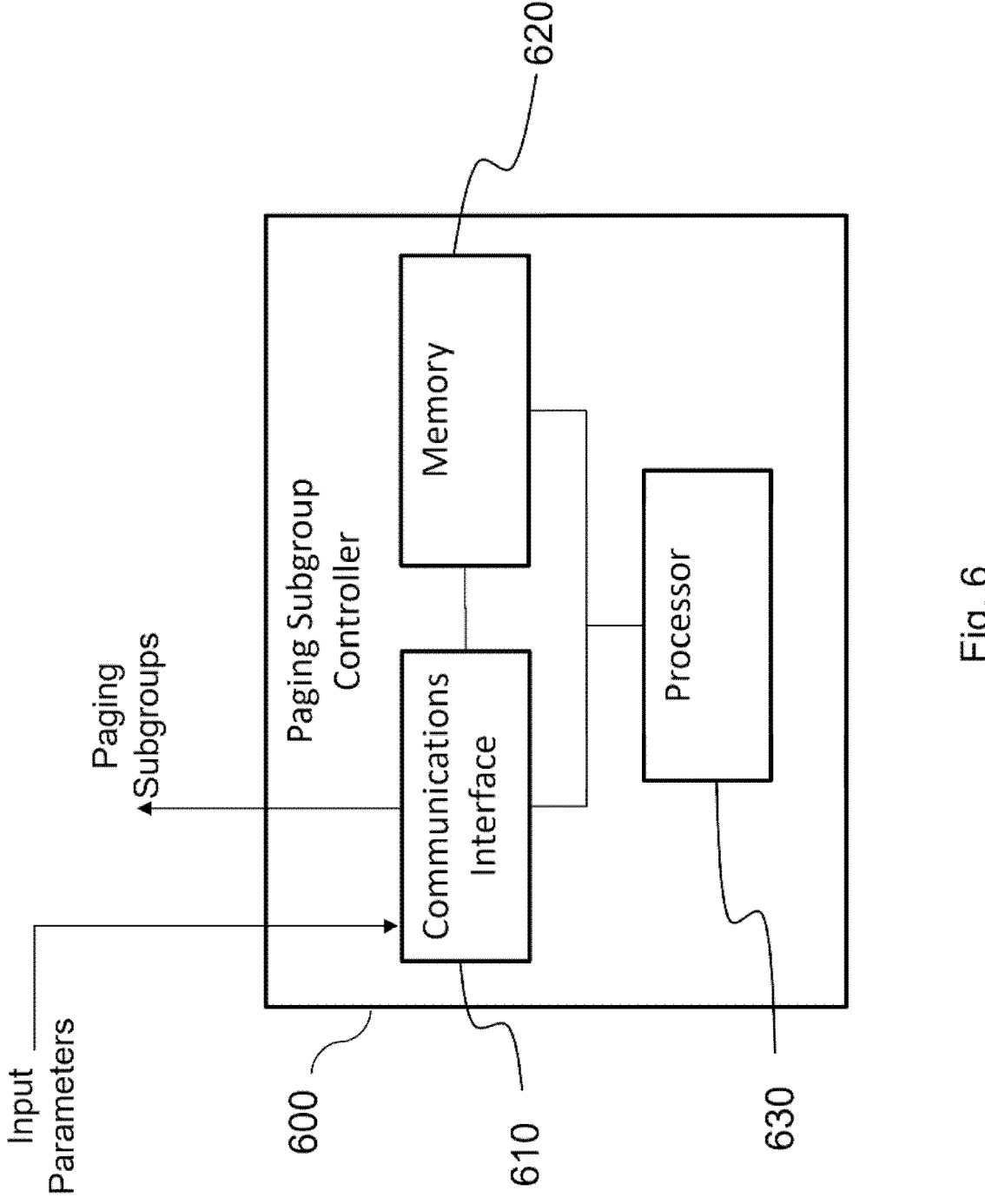
FIG. 6 is an illustration of a block diagram of an example of a paging subgroup controller according to the principles of the disclosure.

FIG. 6 is an illustration of a block diagram of an example of paging subgroup controller 600 according to the principles of the disclosure. Paging subgroup controller 600 can be stored on a single computer or on multiple computers. The various components of paging subgroup controller 600 can communicate via wireless or wired conventional connections. A portion or a whole of paging subgroup controller 600 can be located as part of a RAN and other portions of paging subgroup controller 600 can be located as part of a CN communicating with the RAN. Paging subgroup controller 600 can be virtual or partially virtual while hosted on another system or process.

Paging subgroup controller 600 can be configured to perform the various functions disclosed herein including receiving assistance information, determining a number of paging subgroups, and assigning UEs to a respective paging subgroup. The various functions performed can be an execution of the methods and processes described herein, such as method 400 of FIG. 4. Paging subgroup controller 600 includes a communications interface 610, a memory 620, and a processor 630.

Communications interface 610 is configured to transmit and receive data. For example, communications interface 610 can receive the assistance information, e.g., UE parameters, from UEs, and assistance information, e.g., network parameters, from the CN, such as assistance information. Communications interface 610 can transmit the paging subgroups, and other generated results. Communications interface 610 can communicate via communication systems used in the industry. For example, wireless or wired protocols can be used. Communication interface 610 is capable of performing the operations as described for transceiver 540 of FIG. 5.

Memory 620 can be configured to store a series of operating instructions that direct the operation of processor 630 when initiated, including the code representing the algorithms for determining the paging subgroups, as well as data, parameters, and other information. Memory 620 is a non-transitory computer readable medium. Multiple types of memory can be used for data storage and memory 620 can be distributed.

Processor 630 can be configured to determine and assign the paging subgroups utilizing the received assistance information, such as UE parameters, and, if provided, CN network parameters. For example, processor 630 can perform an analysis of the UE parameters to determine into which paging subgroup each UE should be placed, and for MUSIM UEs, each SIM of the UE can be placed in the same or different paging subgroup. Processor 630 can be configured to direct the operation of the paging subgroup controller 600. Processor 630 includes the logic to communicate with communications interface 610 and memory 620, and perform the functions described herein to determine the paging subgroups. Processor 630 is capable of performing or directing the operations as described by paging subgroup generator 545 of FIG. 5.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple, or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects as described in the SUMMARY section can have one or more of the following additional elements in combination. Element 1: wherein the assistance information is one or more of one or more UE parameters or one or more network parameters Element 2: where the one or more UE parameters are received from a UE and the one or more network parameters are received from CN Element 3: where the one or more UE parameters are one or more of a UE capability parameter, one or more of a UE type parameter, one or more of an ID preference parameter, one or more of a location parameter, or a mobility parameter. Element 4: wherein the processor is a RAN and the network parameters comprise subgrouping splits, a total number of subgroups, or a number of subgroups for each UE subset, received from the CN, and the network parameters are utilized as the assistance information to determine the one or more paging subgroups. Element 5: wherein the processor is the CN and the network parameters comprise split of paging subgroups, stationarity or mobility information of the UEs, received from a RAN, and the network parameters are utilized as the assistance information to determine the one or more paging subgroups. Element 6: wherein at least one of the one or more UE parameters is the UE type parameter and is one of a RedCap parameter, an eMBB parameter, or a MUSIM parameter. Element 7: wherein the processor is further operable to determine two or more UE subsets, and a CN and the UE interaction is utilized to determine a first UE subset, in the two or more UE subsets, that the UE is assigned, and the first UE subset is assigned to a paging subgroup in the one or more paging subgroups. Element 8: wherein a UE ID of the UE is utilized to assign the UE to the paging subgroup. Element 9: wherein the assistance information comprises one or more paging parameters of a paging probability parameter, a power consumption profile parameter, an eDRX parameter, a UE subtype parameter, or a paging subgroup parameter, and the processor utilizes the one or more paging parameters to determine the one or more paging subgroups. Element 10: wherein the assistance information comprises an ID preference parameter to specify two or more IDs of the UE, where the two or more IDs are requested to be in a same paging subgroup of the one or more paging subgroups. Element 11: wherein the transceiver is further operable to transmit the one or more paging subgroups to the UE, where the one or more paging subgroups is explicitly directed to the UE or derived by the UE utilizing parameters comprised with the one or more paging subgroups. Element 12: wherein the transceiver is further operable to transmit a different paging subgroup of the one or more paging subgroups for each UE ID of the UE. Element 13: wherein the processor utilizes a different parameter of the assistance information for each of the one or more paging subgroups. Element 14: wherein the UE is in a radio resource control (RRC) connected state, an RRC Inactive state, or an RRC Idle state. Element 15: wherein the processor communicates the one or more paging subgroups to the UE utilizing a system information signal, an RRC Release signal, or an RRCReconfiguration signal. Element 16: wherein the assistance information is one or more of one or more UE parameters or one or more network parameters, where the one or more UE parameters are received from one or more UE and the one or more network parameters are received from a CN, and where the one or more UE parameters are one or more of a UE capability parameter, one or more of a UE type parameter, one or more of an ID preference parameter, one or more of a location parameter, or one or more of a mobility parameter. Element 17: wherein the communication node is a RAN and the network parameters comprise subgrouping splits, a total number of subgroups, or a number of subgroups for each UE subset, received from the CN, and the network parameters are utilized as the assistance information to determine and assign the set of paging subgroups. Element 18: wherein the communication node is the CN and the network parameters comprise split of paging subgroups, stationarity or mobility information of the UE, and the network parameters are utilized as the assistance information to determine the set paging subgroups. Element 19: wherein at least one of the one or more UE parameters is the UE type parameter and is one of a RedCap parameter, an eMBB parameter, or a MUSIM parameter. Element 20: wherein the assistance information comprises one or more paging parameters of a paging probability parameter, a power consumption profile parameter, an eDRX parameter, a UE subtype parameter, or a paging subgroup parameter, and the communication node utilizes the one or more paging parameters to determine and assign the set paging subgroups. Element 21: wherein the assistance information comprises an ID preference parameter to specify two or more IDs of one of the one or more UEs, where the two or more IDs are requested to be in a same paging subgroup of the set of paging subgroups. Element 22: wherein the respective paging subgroup is explicitly directed to the one or more UEs or derived by the one or more UEs utilizing parameters comprised with the set of paging subgroups. Element 23: wherein the respective paging subgroup comprises two or more paging subgroups corresponding to two or more SIM of one of the one or more UEs, and the two or more paging subgroups are different. Element 24: wherein the assigning utilizes a different parameter of the assistance information for each paging subgroup in the set of paging subgroups. Element 25: wherein the one or more UEs are in RRC a connected state, an RRC Inactive state, or an RRC Idle state. Element 26: wherein the communicating utilizes a system information signal, an RRC Release signal, or an RRCReconfiguration signal. Element 27: wherein the communication node is a radio access network (RAN) and the assistance information is received from the UE or a CN. Element 28: wherein the communication node is a CN and the assistance information is received from the UE or a RAN. Element 29: wherein the assistance information comprises one or more paging parameters of a paging probability parameter, a power consumption profile parameter, an eDRX parameter, a UE subtype parameter, or a paging subgroup parameter, and the communication node utilizes the one or more paging parameters to determine and assign the one or more paging subgroups. Element 30: wherein the assistance information comprises an ID preference parameter to specify two or more IDs of the UE, where the two or more IDs are requested to be in a same paging subgroup of the one or more paging subgroups. Element 31: wherein the paging subgroup is derived by the UE utilizing parameters comprised with the one or more paging subgroups. Element 32: wherein the one or more paging subgroups are at least two paging subgroups, where each paging subgroup in the at least two paging subgroups correspond to a SIM of the UE. Element 33: wherein the communication node utilizes a different parameter of the assistance information for each paging subgroup in the one or more paging subgroups. Element 34: wherein the UE is in an RRC connected state, an RRC Inactive state, or an RRC Idle state. Element 35: wherein the communication node utilizes a system information signal, an RRC Release signal, or an RRCReconfiguration signal to communicate the one or more paging subgroups. Element 36: wherein the assistance information is received utilizing an RRC message or a NAS signal.

What is claimed is:

1. An apparatus, comprising:
   a transceiver, operable to receive and communication signals; and
   transmit a processor, operable to communicate with the transceiver, and to:
      determine one or more paging subgroups utilizing assistance information, and a number of user equipments (UEs), including a first UE, communicating with the transceiver;
      determine an assignment of at least the first UE to the one or more paging subgroups; and
      transmit the one or more paging subgroups to the first UE, wherein the one or more paging subgroups are determined to be derived by the first UE based, at least partially, on at least one parameter comprised by the one or more paging subgroups.

2. The apparatus as recited in claim 1, wherein the assistance information comprises one or more network parameters received from a core network (CN).

3. The apparatus as recited in claim 2, wherein the assistance information comprises an indication of the first UE and the one or more paging subgroups.

4. The apparatus as recited in claim 2, wherein the apparatus is comprised in the CN and the one or more network parameters comprise a split of paging subgroups, and stationarity or mobility information of the first UE, received from a random access network (RAN), and the one or more network parameters are utilized as the assistance information to determine the one or more paging subgroups.

5. The apparatus as recited in claim 1, wherein the assistance information comprises one or more UE parameters received from the first UE; and
   wherein the one or more UE parameters comprise one or more of a UE capability parameter, one or more of a UE type parameter, one or more of an identification (ID)

preference parameter, one or more of a location parameter, or a mobility parameter.

6. The apparatus as recited in claim 1, wherein the processor is further operable to determine two or more UE subsets, and a core network (CN)-UE interaction is utilized to determine a first UE subset, in the two or more UE subsets, to which the first UE is assigned, and the first UE subset is assigned to a paging subgroup in the one or more paging subgroups.

7. The apparatus as recited in claim 1, wherein a UE identification of the first UE and a total number of subgroups are utilized to assign the first UE to the one or more paging subgroups.

8. The apparatus as recited in claim 1, wherein the assistance information comprises one or more paging parameters of an extended discontinuous reception (eDRX) parameter and/or a paging subgroup parameter, and the processor is further operable to utilize the one or more paging parameters to determine the one or more paging subgroups.

9. The apparatus as recited in claim 1, wherein the assistance information comprises an identification (ID) preference parameter to specify two or more IDs of the first UE, where the two or more IDs are requested to be in a same paging subgroup of the one or more paging subgroups.

10. The apparatus as recited in claim 1, wherein the transceiver is further operable to transmit a different paging subgroup of the one or more paging subgroups for each UE identification (ID) of the first UE.

11. The apparatus as recited in claim 1, wherein the processor is further operable to utilize a different parameter of the assistance information for respective ones of the one or more paging subgroups.

12. The apparatus as recited in claim 1, wherein the first UE is in a radio resource control (RRC) connected state, an RRC Inactive state, or an RRC Idle state.

13. The apparatus as recited in claim 1, wherein the one or more paging subgroups are transmitted to the first UE utilizing a system information signal, an radio resource control (RRC) Release signal, or an RRCReconfiguration signal.

14. The apparatus as recited in claim 1, wherein the assistance information is received utilizing a radio resource control (RRC) message or a non-access stratum (NAS) signal.

15. A method, comprising:
   receiving assistance information at a communication node regarding one or more user equipments (UEs), wherein the one or more UEs, including a first UE, communicate with the communication node;
   determining a number of paging subgroups in a set of paging subgroups utilizing the assistance information;
   assigning at least the first UE of the one or more UEs to a respective paging subgroup in the set of paging subgroups; and
   communicating, to the first UE, the respective paging subgroup, wherein the respective paging subgroup is determined to be derived by the first UE based, at least partially, on at least one parameter comprised by the one or more paging subgroups.

16. The method as recited in claim 15, wherein the assistance information comprises one or more network parameters received from a core network (CN).

17. The method as recited in claim 16, wherein the assistance information comprises an indication of the one or more UEs and the respective paging subgroup.

18. The method as recited in claim 15, wherein the assistance information comprises one or more paging parameters of an extended discontinuous reception (eDRX) parameter and/or a paging subgroup parameter, and the communication node utilizes the one or more paging parameters to determine and assign the set of paging subgroups.

19. The method as recited in claim 15, wherein UE identifications of the one or more UEs and a total number of subgroups are utilized to assign the one or more UEs to set of paging subgroups.

20. The method as recited in claim 15, wherein the assistance information comprises one or more UE parameters received from the first UE; and wherein the one or more UE parameters comprise one or more of a UE capability parameter, one or more of a UE type parameter, one or more of an identification (ID) preference parameter, one or more of a location parameter, or a mobility parameter.

* * * * *